(12) United States Patent
Kitamura et al.

(10) Patent No.: US 8,680,004 B2
(45) Date of Patent: Mar. 25, 2014

(54) EXHAUST GAS-PURIFYING CATALYST

(75) Inventors: Ichiro Kitamura, Kakegawa (JP); Akimasa Hirai, Kakegawa (JP); Kenichi Taki, Kakegawa (JP)

(73) Assignee: Cataler Corporation, Shizuoka (JP)

(*) Notice: Subject to any disclaimer, the term of this patent is extended or adjusted under 35 U.S.C. 154(b) by 376 days.

(21) Appl. No.: 13/006,352

(22) Filed: Jan. 13, 2011

(65) Prior Publication Data

US 2011/0111949 A1    May 12, 2011

Related U.S. Application Data

(63) Continuation of application No. PCT/JP2009/062985, filed on Jul. 17, 2009.

(30) Foreign Application Priority Data

Jul. 17, 2008 (JP) .................................. 2008-186164

(51) Int. Cl.
*B01J 23/00* (2006.01)
*B01J 23/10* (2006.01)

(52) U.S. Cl.
USPC ........................... 502/302; 502/325; 502/328

(58) Field of Classification Search
USPC ............. 502/73, 74, 302, 303, 304, 325, 328, 502/349
See application file for complete search history.

(56) References Cited

U.S. PATENT DOCUMENTS

| | | | |
|---|---|---|---|
| 5,248,650 A * | 9/1993 | Sekiba et al. | 502/303 |
| 6,294,140 B1 | 9/2001 | Mussmann et al. | |
| 2004/0223897 A1 | 11/2004 | Yeo | |
| 2007/0274889 A1* | 11/2007 | Nakatsuji et al. | 423/213.2 |
| 2008/0096759 A1 | 4/2008 | Hori et al. | |
| 2009/0084090 A1 | 4/2009 | Nakatsuji et al. | |
| 2010/0055012 A1* | 3/2010 | Grisstede et al. | 423/213.5 |

FOREIGN PATENT DOCUMENTS

| | | |
|---|---|---|
| CN | 1053899 A | 8/1991 |
| EP | 0 885 650 A1 | 12/1998 |
| EP | 1 810 738 A1 | 7/2007 |
| EP | 1 875 954 A1 | 1/2008 |
| JP | 4-284847 | 10/1992 |
| JP | 8-192051 | 7/1996 |
| JP | 9-500570 | 1/1997 |
| JP | 2002-45701 | 2/2002 |
| JP | 2003-200049 | 7/2003 |
| JP | 2004-114014 | 4/2004 |
| JP | 2004-167441 | 6/2004 |
| JP | 2004167441 A * | 6/2004 |

(Continued)

OTHER PUBLICATIONS

Notification of Transmittal of Translation of the International Preliminary Report on Patentability and International Preliminary Report on Patentability, in connection with PCT/JP2009/062985, issued Feb. 17, 2011.

(Continued)

*Primary Examiner* — Anthony J Zimmer
(74) *Attorney, Agent, or Firm* — John P. White; Cooper & Dunham LLP

(57) ABSTRACT

Provided is an exhaust gas-purifying catalyst excelling in an exhaust gas-purifying performance. The exhaust gas-purifying catalyst contains a substrate, and a catalyst layer formed on the substrate and containing a precious metal and praseodymium.

6 Claims, 1 Drawing Sheet

(56) References Cited

FOREIGN PATENT DOCUMENTS

| | | |
|---|---|---|
| JP | 2007-527314 | 9/2007 |
| JP | 2007-326001 | 12/2007 |
| JP | 2008-080196 | 4/2008 |

OTHER PUBLICATIONS

Nov. 22, 2011 search report in connection with European patent application EP 09 79 7997.

Jun. 15, 2012 Official Action (with English Translation) in connection with Chinese Patent Application No. 200980127507.0.

Chinese official action (including English translation thereof) mailed on Jun. 15, 2012 by the Chinese Patent Office, in connection with Chinese Patent Application No. 200980127507.0.

Zhang Jiguan (2004) Techniques of Adjusting Catalysts (or "Techniques in Manufacturing Catalysts in Japanese"), China Petrochemical Press: p. 418 (partial English language summary included on p. 5 of the English translation of the Jun. 15, 2012 Chinese official action).

* cited by examiner

EXHAUST GAS-PURIFYING CATALYST

CROSS REFERENCE TO RELATED APPLICATIONS

This is a Continuation application of PCT Application No. PCT/JP2009/062985, filed Jul. 17, 2009, which was published under PCT Article 21(2) in Japanese.

This application is based upon and claims the benefit of priority from prior Japanese Patent Application No. 2008-186164, filed Jul. 17, 2008, the entire contents of which are incorporated herein by reference.

BACKGROUND OF THE INVENTION

1. Field of the Invention

The present invention relates to an exhaust gas-purifying catalyst.

2. Description of the Related Art

Recently, restrictions on exhaust gas generated by automobiles, etc. have been strengthened. This brings exploitations on various kinds of exhaust gas-purifying catalysts for effectively purifying hydrocarbon (HC), carbon monoxide (CO), nitrogen oxide ($NO_x$), and the like in the exhaust gas.

For example, patent reference 1 discloses an exhaust gas-purifying catalyst comprising a support containing alumina and zeolite, and precious metal supported thereon.

However, there remains further improvements on the exhaust gas-purifying performance of the exhaust gas-purifying catalysts.

[Patent reference 1] Jpn. Pat. Appln. KOKAI Publication No. 2002-45701.

BRIEF SUMMARY OF THE INVENTION

A purpose of the present invention is to provide an exhaust gas-purifying catalyst excelling in an exhaust gas-purifying performance.

According to one aspect of the present invention, there is provided an exhaust gas-purifying catalyst comprising a substrate and a catalyst layer formed on the substrate and containing a precious metal and praseodymium.

DETAILED DESCRIPTION OF THE INVENTION

Figure 1:
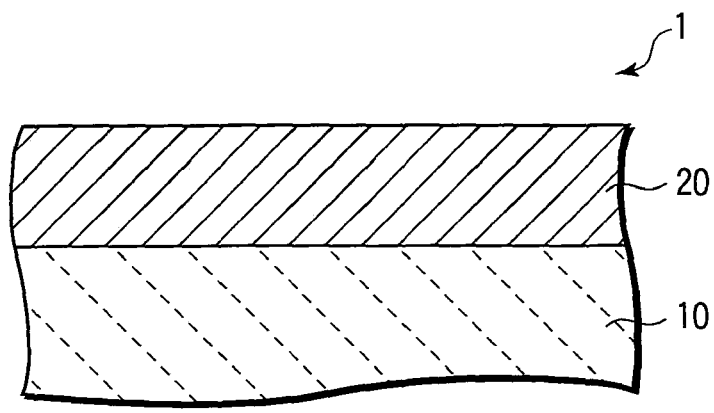
FIG. 1 is a sectional view schematically showing an exhaust gas-purifying catalyst according to one embodiment of the present invention.

Referring to the drawings, embodiments of the present invention will be described in detail below. In the drawings, elements that are the same or similar in function are given the same reference characters, and their description will not be repeated.

FIG. 1 is a sectional view schematically showing an exhaust gas-purifying catalyst according to one embodiment of the present invention. The exhaust gas-purifying catalyst 1 contains a substrate 10 and a catalyst layer 20 formed on the substrate 10.

As the substrate 10, those of monolith-honeycomb structure may be used. The substrate 10 is typically made of ceramics such as cordierite.

The catalyst layer 20 contains a support containing praseodymium, and a precious metal supported thereon.

As stated, exhaust gas-purifying catalysts are demanded to effectively purify a plurality of factors such as HC, CO, and $NO_x$. Each of these factors is, however, different in temperature necessary for activating catalysts. For example, temperature necessary for purifying HC is higher than that for purifying CO. This means that, at stages temperature of which is relatively low, such as right after firing up the engine, there can be a situation in which CO may be purified to some extent while HC not being sufficiently purified. Therefore, in order to sufficiently purify all the factors above, temperature of catalysts needs to be rapidly increased.

The inventors of the present invention have found that letting praseodymium contained in a support can enhance CO adsorption onto the catalyst layer. Further investigations by the inventors have revealed that enhanced CO adsorption onto the catalyst layer makes CO oxidation reaction in the catalyst layer more active, thus generating large amount of heat resulting from the oxidation reaction. The present invention have been accomplished based on the finding. Namely, the present invention is based on the idea to rapidly accomplish the purification of the plurality of factors by rapidly increasing the temperature of the catalyst with the help of the heat of reaction stated above.

A support contained in the catalyst layer 20 plays a role in increasing specific surface area of precious metals and in suppressing sintering of precious metals by dispersing heat generated by reactions. The support contains a praseodymium compound which typically is a praseodymium oxide. As praseodymium oxides, use may be made of $Pr_6O_{11}$. The support may further contains other oxides such as an alumina, a ceria, a zirconia, and a titania. Alternatively, the support may contain a composite oxide of one or more of these oxides and praseodymium oxide.

Praseodymium content in the catalyst layer 20 based on unit volume of the substrate 10 is, for example in the range of 0.2 to 60 g/L, and typically in the range of 1.0 to 20 g/L in terms of $Pr_6O_{11}$. When the praseodymium content in catalyst layer 20 becomes lower, CO adsorption and ignition properties of catalyst 20 may become lower, making it more difficult to achieve excellent exhaust gas-purifying performance. When the praseodymium content in catalyst layer 20 becomes higher, oxygen storage property may become lower, making it more difficult to achieve excellent exhaust gas-purifying performance.

As stated, the support may contain a composite oxide of praseodymium oxide and other oxide than praseodymium oxide. In other words, praseodymium can exist in the from of the composite oxide of praseodymium oxide and other oxide in the catalyst layer 20. This can reduce an aggregation of praseodymium due to thermal deterioration, etc. compared to a case when praseodymium is contained in the form of simple oxide. Therefore, this can enhance a purifying performance after duration.

As the composite oxide, for example, a composite oxide of ceria, zirconia, and praseodymium oxide can be exemplified. When use is made of the composite oxide of ceria, zirconia, and praseodymium oxide, the mass ratio of praseodymium oxide in the composite oxide falls, for example, in the range of 3 to 30 mass %. When the mass ratio becomes lower, the above-mentioned effect accomplished by praseodymium becomes lower. When the mass ratio becomes higher, the mass ratio of ceria and zirconia in the composite oxide becomes lower. Therefore, when the mass ratio of praseodymium oxide in the composite oxide becomes too high, it may become more difficult to purify HC, CO, and $NO_x$ in exhaust gas in a well-balanced manner.

The precious metal plays a role in catalyzing exhaust gas-purifying reactions. As the precious metals, for example, at least one element selected from the group consisting of platinum, palladium, and rhodium can be exemplified. Other elements such as iridium and ruthenium may further be contained as the precious metal.

The content of precious metal in the catalyst layer 20 is, for example, 0.5 to 20 g/L based on the unit volume of the substrate 10. When the content precious metal in the catalyst layer becomes lower, exhaust gas-purifying performance of exhaust gas-purifying catalyst 1 may become insufficient. When the content precious metal in the catalyst layer becomes higher, production cost of the exhaust gas-purifying catalyst 1 becomes higher.

The exhaust gas-purifying catalyst 1 may further contain an alkaline-earth metal element. The alkaline-earth metal element plays a role in enhancing $NO_x$ purifying performance of the exhaust gas-purifying catalyst 1 without deteriorating HC purifying performance thereof. As the alkaline-earth metal element, for example, barium, strontium, calcium, or magnesium can be used. Barium is typically used as the alkaline-earth metal element.

The exhaust gas-purifying catalyst 1 may further contain other rare-earth element than praseodymium. The rare-earth element plays a role in enhancing $NO_x$ purifying performance of the exhaust gas-purifying catalyst 1 without deteriorating HC purifying performance thereof. As the rare-earth element, for example, lanthanoids such as lanthanum can be used. Lanthanum is typically used as the rare-earth element.

The catalyst layer 20 may further contain a binder. The binder plays a role in enhancing the durability of the exhaust gas-purifying catalyst 1 by making the binding between support particles and the binding between support particle and precious metal become stronger. As the binder, for example, alumina sol, titania sol, or silica sol can be used.

Exhaust gas-purifying catalyst 1 shown in FIG. 1 can be manufactured, for example, by the following method.

First, a solution of precious metal compound and a support containing praseodymium are mixed in a predetermined ratio to prepare a slurry. Second, this slurry is coated on a substrate made of cordierite, etc. Third, this is dried and calcinated.

Exhaust gas-purifying catalyst 1 shown in FIG. 1 can thus be obtained.

Various changes can be made to the above-mentioned exhaust gas-purifying catalyst 1.

Figure 2:
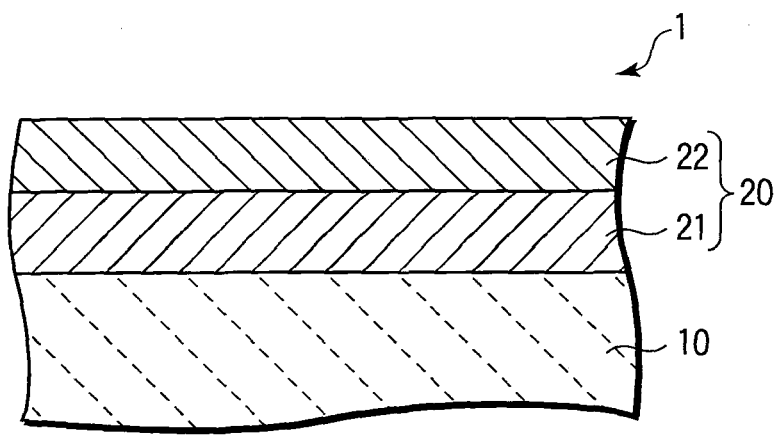
FIG. 2 is a sectional view schematically showing a variation of the exhaust gas-purifying catalyst.

FIG. 2 is a sectional view schematically showing a variation of the exhaust gas-purifying catalyst.

Exhaust gas-purifying catalyst 1 shown in FIG. 2 has the same constitution as that shown in FIG. 1 except that the catalyst layer 20 comprises a first catalyst layer 21 formed on the substrate 10 and a second catalyst layer 22 formed thereon.

The first catalyst layer 21 and the second catalyst layer 22 differ from each other in at least one property among composition of the support, content of praseodymium, surface area of the material used as the support, kind or content of precious metal, and the like. By adjusting the composition, coating amount, etc. of each of the first catalyst layer 21 and the second catalyst layer 22, exhaust gas-purifying performance of the exhaust gas-purifying catalyst 1 may be optimized.

For example, the constitution in which the first catalyst layer 21 contains palladium as the precious metal, whereas the second catalyst layer 22 contains rhodium as the precious metal can be employed. This constitution can give a catalyst showing excellent exhaust gas-purifying performance in both oxidizing and reducing atmosphere.

Alternatively, when the catalyst layer 20 contains a composite oxide containing ceria and zirconia, ratio of ceria and zirconia in the composite oxide can be made different between the first catalyst layer 21 and the second catalyst layer 22. For example, the composition in which the first catalyst layer 21 contains more ceria, whereas the second catalyst layer 22 contains more zirconia can be employed.

Exhaust gas-purifying catalyst 1 shown in FIG. 2 can be manufactured, for example, by the following method.

First, a solution of precious metal compound such as palladium compound and a support are mixed in a predetermined ratio to prepare a first slurry for forming the first catalyst layer 21. Second, this first slurry is coated on a substrate made of cordierite, etc. Third, this is dried and calcinated.

Subsequently, a solution of precious metal compound such as rhodium compound and a support are mixed in a predetermined ratio to prepare a second slurry for forming the second catalyst layer 22. Here, the second slurry is made different from the first slurry in kinds and contents of the contained precious metal, etc. Next, this second slurry is coated on a substrate having been coated with the first slurry. This is then dried and calcinated.

Exhaust gas-purifying catalyst 1 shown in FIG. 2 can thus be obtained.

The exhaust gas-purifying catalyst 1 may further contain a layer without precious metals other than the catalyst layer 20. The catalyst layer 20 may contain three or more layers each being different in one or more properties. In this case too, by adjusting the composition, etc. of each of the layers, exhaust gas-purifying performance of the exhaust gas-purifying catalyst 1 may be optimized.

The exhaust gas-purifying catalyst 1 may further contain a zeolite. The zeolite can be contained as a component in the catalyst layer, or may be contained in another layer intervening the substrate 10 and the catalyst layer 20. Zeolites have high specific surface area, and excel in performance for adsorbing HC in exhaust gas. Thus, containment of zeolite can further improve the HC purifying performance of the exhaust gas-purifying catalyst 1.

The exhaust gas-purifying catalyst 1 may comprise an upstream region to which exhaust gas is provided, and a downstream region to which exhaust gas having passed through the upstream region is provided. In this case, for example, the upstream and the down stream region is different in, for example, praseodymium content, composition of support, or kinds or contents of precious metal. By this, exhaust gas-purifying performance of the exhaust gas-purifying catalyst 1 can be optimized.

EXAMPLE

Example 1

Production of Catalyst C1

A composite oxide containing 50 mass % of ceria, 30 mass % of zirconia, and 20 mass % of praseodymium oxide ($Pr_6O_{11}$) was prepared. This composite oxide will hereinafter be called as "CZP material A."

A slurry was prepared by mixing 3.3 g of CZP material A, 116.7 g of alumina, and palladium nitrate solution containing 1.5 g of palladium. This slurry will hereinafter be called as "slurry S1."

The slurry S1 was coated on a monolith honeycomb substrate being made of cordierite, the length of which being 100 mm, the volume being 1.0 L, and the number of cells being 900/inch². Subsequently, this was dried at 250° C. for 1 hour, then calcinated at 500° C. for 1 hour.

Further, a composite oxide containing 60 mass % of zirconia, 20 mass % of ceria, and 20 mass % of praseodymium oxide ($Pr_6O_{11}$) was prepared. This composite oxide will hereinafter be called as "ZCP material B."

A slurry was prepared by mixing 1.7 g of ZCP material B, 58.3 g of alumina, and rhodium nitrate solution containing 0.5 g of rhodium. This slurry will hereinafter be called as "slurry S2."

The slurry S2 was coated on the monolith honeycomb substrate having been coated with the slurry S1. Subsequently, this was dried at 250° C. for 1 hour, then calcinated at 500° C. for 1 hour.

An exhaust gas-purifying catalyst was thus produced. This catalyst will hereinafter be called as "catalyst C1."

The praseodymium content of the catalyst C1 based on unit volume of the substrate was 1.0 g/L in terms of $Pr_6O_{11}$. The palladium content of the catalyst C1 based on unit volume of the substrate was 1.5 g/L. The rhodium content of the catalyst C1 based on unit volume of the substrate was 0.5 g/L.

Example 2

Production of Catalyst C2

A slurry was prepared by mixing 66.7 g of CZP material A, 53.3 g of alumina, and palladium nitrate solution containing 1.5 g of palladium. This slurry will hereinafter be called as "slurry S3."

A slurry was prepared by mixing 33.3 g of ZCP material B, 26.7 g of alumina, and rhodium nitrate solution containing 0.5 g of rhodium. This slurry will hereinafter be called as "slurry S4."

An exhaust gas-purifying catalyst was produced in the same way as stated for the catalyst C1, except that the slurry S3 was used in place of the slurry S1 and the slurry S4 was used in place of the slurry S2. This catalyst will hereinafter be called as "catalyst C2."

The praseodymium content of the catalyst C2 based on unit volume of the substrate was 20 g/L in terms of $Pr_6O_{11}$. The palladium content of the catalyst C2 based on unit volume of the substrate was 1.5 g/L. The rhodium content of the catalyst C2 based on unit volume of the substrate was 0.5 g/L.

Example 3

Production of Catalyst C3

A slurry was prepared by mixing 0.7 g of CZP material A, 119.3 g of alumina, and palladium nitrate solution containing 1.5 g of palladium. This slurry will hereinafter be called as "slurry S5."

A slurry was prepared by mixing 0.3 g of ZCP material B, 59.7 g of alumina, and rhodium nitrate solution containing 0.5 g of rhodium. This slurry will hereinafter be called as "slurry S6."

An exhaust gas-purifying catalyst was produced in the same way as stated for the catalyst C1, except that the slurry S5 was used in place of the slurry S1 and the slurry S6 was used in place of the slurry S2. This catalyst will hereinafter be called as "catalyst C3."

The praseodymium content of the catalyst C3 based on unit volume of the substrate was 0.2 g/L in terms of $Pr_6O_{11}$. The palladium content of the catalyst C3 based on unit volume of the substrate was 1.5 g/L. The rhodium content of the catalyst C3 based on unit volume of the substrate was 0.5 g/L.

Example 4

Production of Catalyst C4

A composite oxide containing 30 mass % of ceria, 20 mass % of zirconia, and 50 mass % of $Pr_6O_{11}$ was prepared. This composite oxide will hereinafter be called as "CZP material C."

A slurry was prepared by mixing 80 g of CZP material C, 40 g of alumina, and palladium nitrate solution containing 1.5 g of palladium. This slurry will hereinafter be called as "slurry S7."

Further, a composite oxide containing 30 mass % of zirconia, 20 mass % of ceria, and 50 mass % of $Pr_6O_{11}$ was prepared. This composite oxide will hereinafter be called as "ZCP material D."

A slurry was prepared by mixing 40 g of ZCP material D, 20 g of alumina, and rhodium nitrate solution containing 0.5 g of rhodium. This slurry will hereinafter be called as "slurry S8."

An exhaust gas-purifying catalyst was produced in the same way as stated for the catalyst C1, except that the slurry S7 was used in place of the slurry S1 and the slurry S8 was used in place of the slurry S2. This catalyst will hereinafter be called as "catalyst C4."

The praseodymium content of the catalyst C4 based on unit volume of the substrate was 60 g/L in terms of $Pr_6O_{11}$. The palladium content of the catalyst C4 based on unit volume of the substrate was 1.5 g/L. The rhodium content of the catalyst C4 based on unit volume of the substrate was 0.5 g/L.

Example 5

Production of Catalyst C5

A slurry containing 100 g of zeolite was prepared. This slurry will hereinafter be called as "slurry S9."

The slurry S9 was coated on the same monolith honeycomb substrate as stated for Example 1. Subsequently, this was dried at 250° C. for 1 hour, then calcinated at 500° C. for 1 hour.

The slurry S1 was coated on the monolith honeycomb substrate having been coated with the slurry S9. Subsequently, this was dried at 250° C. for 1 hour, then calcinated at 500° C. for 1 hour.

The slurry S2 was then coated on the monolith honeycomb substrate having been coated with the slurry S9 and S1. Subsequently, this was dried at 250° C. for 1 hour, then calcinated at 500° C. for 1 hour.

An exhaust gas-purifying catalyst was thus produced. This catalyst will hereinafter be called as "catalyst C5."

The praseodymium content of the catalyst C5 based on unit volume of the substrate was 1.0 g/L in terms of $Pr_6O_{11}$. The palladium content of the catalyst C5 based on unit volume of the substrate was 1.5 g/L. The rhodium content of the catalyst C5 based on unit volume of the substrate was 0.5 g/L.

Example 6

Production of Catalyst C6

A slurry was prepared by mixing 3.3 g of CZP material A, 116.7 g of alumina, palladium nitrate solution containing 1.5 g of palladium, 12 g of barium sulfate, and 6 g of lanthanum carbonate. This slurry will hereinafter be called as "slurry S10."

A slurry was prepared by mixing 1.7 g of ZCP material B, 58.3 g of alumina, rhodium nitrate solution containing 0.5 g of rhodium, 6 g of barium sulfate, and 3 g of lanthanum carbonate. This slurry will hereinafter be called as "slurry S11."

An exhaust gas-purifying catalyst was produced in the same way as stated for the catalyst C1, except that the slurry S10 was used in place of the slurry S1 and the slurry S11 was used in place of the slurry S2. This catalyst will hereinafter be called as "catalyst C6."

The praseodymium content of the catalyst C6 based on unit volume of the substrate was 1.0 g/L in terms of $Pr_6O_{11}$. The palladium content of the catalyst C6 based on unit volume of the substrate was 1.5 g/L. The rhodium content of the catalyst C6 based on unit volume of the substrate was 0.5 g/L.

Example 7

Production of Catalyst C7

A composite oxide containing ceria and zirconia in the mass ratio of 5:4 was prepared. This composite oxide will hereinafter be called as "CZ material E."

A slurry was prepared by mixing 2.6 g of CZ material E, 0.7 g of $Pr_6O_{11}$, 116.7 g of alumina, and palladium nitrate solution containing 1.5 g of palladium. This slurry will hereinafter be called as "slurry S12."

A composite oxide containing zirconia and ceria in the mass ratio of 7:2 was prepared. This composite oxide will hereinafter be called as "ZC material F."

A slurry was prepared by mixing 1.4 g of ZC material F, 0.3 g of $Pr_6O_{11}$, 58.3 g of alumina, and rhodium nitrate solution containing 0.5 g of rhodium. This slurry will hereinafter be called as "slurry S13."

An exhaust gas-purifying catalyst was produced in the same way as stated for the catalyst C1, except that the slurry S12 was used in place of the slurry S1 and the slurry S13 was used in place of the slurry S2. This catalyst will hereinafter be called as "catalyst C7."

The praseodymium content of the catalyst C7 based on unit volume of the substrate was 1.0 g/L in terms of $Pr_6O_{11}$. The palladium content of the catalyst C7 based on unit volume of the substrate was 1.5 g/L. The rhodium content of the catalyst C7 based on unit volume of the substrate was 0.5 g/L.

Example 8

Production of Catalyst C8

A slurry was prepared by mixing 0.3 g of CZP material A, 119.7 g of alumina, and palladium nitrate solution containing 1.5 g of palladium. This slurry will hereinafter be called as "slurry S14."

A slurry was prepared by mixing 0.2 g of ZCP material B, 59.8 g of alumina, and rhodium nitrate solution containing 0.5 g of rhodium. This slurry will hereinafter be called as "slurry S15."

An exhaust gas-purifying catalyst was produced in the same way as stated for the catalyst C1, except that the slurry S14 was used in place of the slurry S1 and the slurry S15 was used in place of the slurry S2. This catalyst will hereinafter be called as "catalyst C8."

The praseodymium content of the catalyst C8 based on unit volume of the substrate was 0.1 g/L in terms of $Pr_6O_{11}$. The palladium content of the catalyst C8 based on unit volume of the substrate was 1.5 g/L. The rhodium content of the catalyst C8 based on unit volume of the substrate was 0.5 g/L.

Example 9

Production of Catalyst C9

A slurry was prepared by mixing 81.2 g of CZP material C, 38.8 g of alumina, and palladium nitrate solution containing 1.5 g of palladium. This slurry will hereinafter be called as "slurry S16."

A slurry was prepared by mixing 40.8 g of ZCP material D, 19.2 g of alumina, and rhodium nitrate solution containing 0.5 g of rhodium. This slurry will hereinafter be called as "slurry S17."

An exhaust gas-purifying catalyst was produced in the same way as stated for the catalyst C1, except that the slurry S16 was used in place of the slurry S1 and the slurry S17 was used in place of the slurry S2. This catalyst will hereinafter be called as "catalyst C9."

The praseodymium content of the catalyst C9 based on unit volume of the substrate was 61.0 g/L in terms of $Pr_6O_{11}$. The palladium content of the catalyst C9 based on unit volume of the substrate was 1.5 g/L. The rhodium content of the catalyst C9 based on unit volume of the substrate was 0.5 g/L.

Example 10

Production of Catalyst C10

A slurry was prepared by mixing 60 g of CZ material E, 60 g of alumina, and palladium nitrate solution containing 1.5 g of palladium. This slurry will hereinafter be called as "slurry S18."

A slurry was prepared by mixing 30 g of ZC material F, 30 g of alumina, and rhodium nitrate solution containing 0.5 g of rhodium. This slurry will hereinafter be called as "slurry S19."

An exhaust gas-purifying catalyst was produced in the same way as stated for the catalyst C1, except that the slurry S18 was used in place of the slurry S1 and the slurry S19 was used in place of the slurry S2. This catalyst will hereinafter be called as "catalyst C10."

The catalyst C10 did not contain praseodymium. The palladium content of the catalyst C10 based on unit volume of the substrate was 1.5 g/L. The rhodium content of the catalyst C10 based on unit volume of the substrate was 0.5 g/L.

Example 11

Production of Catalyst C11

A composite oxide containing 50 mass % of ceria, 30 mass % of zirconia, and 20 mass % of $Nd_2O_3$ was prepared. This composite oxide will hereinafter be called as "CZN material G."

A slurry was prepared by mixing 3.3 g of CZN material G, 116.7 g of alumina, and palladium nitrate solution containing 1.5 g of palladium. This slurry will hereinafter be called as "slurry S20."

A composite oxide containing 60 mass % of zirconia, 20 mass % of ceria, and 20 mass % of $Nd_2O_3$ was prepared. This composite oxide will hereinafter be called as "ZCN material H."

A slurry was prepared by mixing 1.7 g of ZCN material H, 58.3 g of alumina, and rhodium nitrate solution containing 0.5 g of rhodium. This slurry will hereinafter be called as "slurry S21."

An exhaust gas-purifying catalyst was produced in the same way as stated for the catalyst C1, except that the slurry S20 was used in place of the slurry S1 and the slurry S21 was used in place of the slurry S2. This catalyst will hereinafter be called as "catalyst C11."

The $Nd_2O_3$ content of the catalyst C11 based on unit volume of the substrate was 1.0 g/L. The palladium content of the catalyst C11 based on unit volume of the substrate was 1.5 g/L. The rhodium content of the catalyst C11 based on unit volume of the substrate was 0.5 g/L.

Example 12

Production of Catalyst C12

A composite oxide containing 50 mass % of ceria, 30 mass % of zirconia, and 20 mass % of $Y_2O_3$ was prepared. This composite oxide will hereinafter be called as "CZY material I."

A slurry was prepared by mixing 3.3 g of CZY material I, 116.7 g of alumina, and palladium nitrate solution containing 1.5 g of palladium. This slurry will hereinafter be called as "slurry S22."

A composite oxide containing 60 mass % of zirconia, 20 mass % of ceria, and 20 mass % of $Y_2O_3$ was prepared. This composite oxide will hereinafter be called as "ZCY material J."

A slurry was prepared by mixing 1.7 g of ZCY material J, 58.3 g of alumina, and rhodium nitrate solution containing 0.5 g of rhodium. This slurry will hereinafter be called as "slurry S23."

An exhaust gas-purifying catalyst was produced in the same way as stated for the catalyst C1, except that the slurry S22 was used in place of the slurry S1 and the slurry S23 was used in place of the slurry S2. This catalyst will hereinafter be called as "catalyst C12."

The $Y_2O_3$ content of the catalyst C12 based on unit volume of the substrate was 1.0 g/L. The palladium content of the catalyst C12 based on unit volume of the substrate was 1.5 g/L. The rhodium content of the catalyst C12 based on unit volume of the substrate was 0.5 g/L.

Example 13

Production of Catalyst C13

A composite oxide containing 50 mass % of ceria, 30 mass % of zirconia, and 20 mass % of $La_2O_3$ was prepared. This composite oxide will hereinafter be called as "CZL material K."

A slurry was prepared by mixing 3.3 g of CZL material K, 116.7 g of alumina, and palladium nitrate solution containing 1.5 g of palladium. This slurry will hereinafter be called as "slurry S24."

A composite oxide containing 60 mass % of zirconia, 20 mass % of ceria, and 20 mass % of $La_2O_3$ was prepared. This composite oxide will hereinafter be called as "ZCL material L."

A slurry was prepared by mixing 1.7 g of ZCL material L, 58.3 g of alumina, and rhodium nitrate solution containing 0.5 g of rhodium. This slurry will hereinafter be called as "slurry S25."

An exhaust gas-purifying catalyst was produced in the same way as stated for the catalyst C1, except that the slurry S24 was used in place of the slurry S1 and the slurry S25 was used in place of the slurry S2. This catalyst will hereinafter be called as "catalyst C13."

The $La_2O_3$ content of the catalyst C13 based on unit volume of the substrate was 1.0 g/L. The palladium content of the catalyst C13 based on unit volume of the substrate was 1.5 g/L. The rhodium content of the catalyst C13 based on unit volume of the substrate was 0.5 g/L.

Example 14

Production of Catalyst C14

A composite oxide containing 45 mass % of ceria, 25 mass % of zirconia, and 30 mass % of $Pr_6O_{11}$ was prepared. This composite oxide will hereinafter be called as "CZP material M."

A slurry was prepared in the same way as stated for the slurry S3, except that the CZP material M was used in place of the CZP material A. This slurry will hereinafter be called as "slurry S26."

A composite oxide containing 55 mass % of zirconia, 15 mass % of ceria, and 30 mass % $Pr_6O_{11}$ was prepared. This composite oxide will hereinafter be called as "ZCP material N."

A slurry was prepared in the same way as stated for the slurry S4, except that the ZCP material N was used in place of the ZCP material B. This slurry will hereinafter be called as "slurry S27."

An exhaust gas-purifying catalyst was produced in the same way as stated for the catalyst C2, except that the slurry S26 was used in place of the slurry S3 and the slurry S27 was used in place of the slurry S4. This catalyst will hereinafter be called as "catalyst C14."

The praseodymium content of the catalyst C14 based on unit volume of the substrate was 30 g/L in terms of $Pr_6O_{11}$. The palladium content of the catalyst C14 based on unit volume of the substrate was 1.5 g/L. The rhodium content of the catalyst C14 based on unit volume of the substrate was 0.5 g/L.

Example 15

Production of Catalyst C15

A composite oxide containing 55 mass % of ceria, 42 mass % of zirconia, and 3 mass % of $Pr_6O_{11}$ was prepared. This composite oxide will hereinafter be called as "CZP material O."

A slurry was prepared in the same way as stated for the slurry S3, except that the CZP material O was used in place of the CZP material A. This slurry will hereinafter be called as "slurry S28."

A composite oxide containing 65 mass % of zirconia, 32 mass % of ceria, and 3 mass % $Pr_6O_{11}$ was prepared. This composite oxide will hereinafter be called as "ZCP material P."

A slurry was prepared in the same way as stated for the slurry S4, except that the ZCP material P was used in place of the ZCP material B. This slurry will hereinafter be called as "slurry S29."

An exhaust gas-purifying catalyst was produced in the same way as stated for the catalyst C2, except that the slurry S28 was used in place of the slurry S3 and the slurry S29 was used in place of the slurry S4. This catalyst will hereinafter be called as "catalyst C15."

The praseodymium content of the catalyst C15 based on unit volume of the substrate was 3 g/L in terms of $Pr_6O_{11}$. The palladium content of the catalyst C15 based on unit volume of the substrate was 1.5 g/L. The rhodium content of the catalyst C15 based on unit volume of the substrate was 0.5 g/L.

<Evaluation of Exhaust Gas-Purifying Performance>

Catalysts C1 to C15 were evaluated on exhaust gas-purifying performance.

Endurance test corresponding to 60000 km run were performed on each of the catalysts C1 to C15. Next, each of these was installed on a real vehicle having 0.7 L displacement. Subsequently, the real vehicle was made run in a JC08C mode (JC08 mode with "cold start") and in a JC08H mode (JC08 mode with "hot start"). The emissions of non-methane hydrocarbon (NMHC), CO, and $NO_x$ in each mode were measured accordingly. The emissions in each mode were substituted in the following formula, giving combined values of the emissions of NMHC, CO, and $NO_x$ in JC08 mode.

$$E = 0.25 \times E_C + 0.75 \times E_H \quad \text{[Formula 1]}$$

In the formula, E means a combined value of the emissions in JC08 mode, $E_C$ means a measure value of the emissions in JC08C mode, and $E_H$ means a measure value of the emissions in JC08H mode. The following Table summarizes the combined values thus obtained.

TABLE 1

| Catalyst | NMHC(g/km) | CO(g/km) | $NO_x$(g/km) |
|---|---|---|---|
| C1 | 0.007 | 0.556 | 0.005 |
| C2 | 0.007 | 0.512 | 0.004 |
| C3 | 0.012 | 0.602 | 0.007 |
| C4 | 0.014 | 0.653 | 0.010 |
| C5 | 0.006 | 0.560 | 0.005 |
| C6 | 0.007 | 0.553 | 0.004 |
| C7 | 0.009 | 0.549 | 0.005 |
| C8 | 0.021 | 1.103 | 0.012 |
| C9 | 0.020 | 0.809 | 0.014 |
| C10 | 0.025 | 1.321 | 0.016 |
| C11 | 0.023 | 1.216 | 0.015 |
| C12 | 0.023 | 1.203 | 0.015 |
| C13 | 0.022 | 1.210 | 0.014 |
| C14 | 0.007 | 0.509 | 0.004 |
| C15 | 0.006 | 0.478 | 0.004 |

The results shown in the Table above demonstrate the followings.

Catalysts C1 to C9, C14, and C15 turned out to show distinguished exhaust gas-purifying performance compared to catalysts C10 to C13.

Comparison of catalysts C1 to C7 with catalysts C8 to C10 reveals that praseodymium content in the catalyst layer based on unit volume of the substrate is preferably in the range of 0.2 to 60 g/L, and more preferably in the range of 1.0 to 20 g/L in terms of $Pr_6O_{11}$.

Comparison of catalysts C1 to C3, C14, and C15 with C4 reveals the following. That is, it is revealed that, in the case when the support contains a composite oxide containing ceria, zirconia, and praseodymium oxide, making the mass ratio of praseodymium oxide fall in the composite oxide in the range of 3 to 30 mass % can improve the exhaust gas-purifying performance of the catalysts.

Comparison between catalysts C1 and C5 reveals that forming a layer containing zeolite between the substrate and the catalyst layer can improve the HC purifying performance. This may be due to the fact that zeolites possess good HC adsorption property.

Comparison between catalysts C1 and C6 reveals that addition of barium and lanthanum can improve $NO_x$ purifying property while keeping equivalent HC purifying property.

Comparison between catalysts C1 and C7 reveals that using a composite oxide of ceria, zirconia and praseodymium oxide can improve HC purifying property while keeping equivalent $NO_x$ purifying property.

Comparison of catalysts C1 with C11 to C13 reveals that praseodymium oxide can more remarkably improve the exhaust gas-purifying property of the catalyst compared to neodymium oxide, yttrium oxide, or lanthanum oxide. That is, it is revealed that praseodymium oxide has superior property as a rare-earth oxide for improving the exhaust gas-purifying property of the exhaust gas-purifying catalyst.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An exhaust gas-purifying catalyst comprising:
a substrate;
a layer containing zeolite and formed on the substrate;
a first catalyst layer containing a precious metal and praseodymium and formed on the layer containing zeolite; and
a second catalyst layer containing a precious metal and praseodymium and formed on the first catalyst layer.

2. The exhaust gas-purifying catalyst according to claim 1, wherein at least one of the first and second catalyst layers further contains barium and lanthanum.

3. The exhaust gas-purifying catalyst according to claim 1, wherein at least one of the first and second catalyst layers further contains a composite oxide of a praseodymium oxide and an other oxide than the praseodymium oxide.

4. The exhaust gas-purifying catalyst according to claim 3, wherein the composite oxide is a composite oxide of ceria, zirconia, and the praseodymium oxide, and mass ratio of the praseodymium oxide in the composite oxide falls in the range of 3 mass % to 30 mass %.

5. The exhaust gas-purifying catalyst according to claim 1, wherein praseodymium content in the catalyst layers based on unit volume of the substrate falls in the range of 0.2 g/L to 60 g/L in terms of $Pr_6O_{11}$.

6. The exhaust gas-purifying catalyst according to claim 1, wherein praseodymium content in the catalyst layers based on unit volume of the substrate falls in the range of 1.0 g/L to 20 g/L in terms of $Pr_6O_{11}$.

* * * * *